United States Patent
Geusic et al.

(10) Patent No.: US 7,512,170 B2
(45) Date of Patent: Mar. 31, 2009

(54) METHOD OF FORMING MIRRORS BY SURFACE TRANSFORMATION OF EMPTY SPACES IN SOLID STATE MATERIALS

(75) Inventors: Joseph E. Geusic, Berkeley Heights, NJ (US); Eugene P. Marsh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 446 days.

(21) Appl. No.: 11/476,918

(22) Filed: Jun. 29, 2006

(65) Prior Publication Data
US 2007/0036196 A1 Feb. 15, 2007

Related U.S. Application Data

(63) Continuation of application No. 09/855,532, filed on May 16, 2001, now Pat. No. 7,142,577.

(51) Int. Cl.
*H01S 3/08* (2006.01)
(52) U.S. Cl. .......................... 372/99; 372/107
(58) Field of Classification Search ................ 372/99, 372/107
See application file for complete search history.

(56) References Cited

U.S. PATENT DOCUMENTS

| | | |
|---|---|---|
| 3,497,455 A | 2/1970 | Ahr |
| 4,241,359 A | 12/1980 | Izumi et al. |
| 4,314,595 A | 2/1982 | Yamamoto et al. |
| 4,589,928 A | 5/1986 | Dalton |
| 4,717,681 A | 1/1988 | Curran |
| 4,756,956 A | 7/1988 | Nagai et al. |
| 4,962,051 A | 10/1990 | Liaw |
| 4,962,058 A | 10/1990 | Cronin et al. |
| 4,992,321 A | 2/1991 | Kandachi et al. |
| 5,055,426 A | 10/1991 | Manning |
| 5,098,852 A | 3/1992 | Niki et al. |
| 5,110,754 A | 5/1992 | Lowrey et al. |
| 5,250,459 A | 10/1993 | Lee |
| 5,404,029 A | 4/1995 | Husher et al. |
| 5,426,061 A | 6/1995 | Sopori |

(Continued)

FOREIGN PATENT DOCUMENTS

EP 0 434 984 7/1991

(Continued)

OTHER PUBLICATIONS

Abe, T.; Nakano, M.; Itho, T.; Takei, T.; Uchiyama, A.; Yoshizawa, K.; Nakazato, Y., Silicon Wafer-Bonding Process Technology for SOI Structures, Extended Abstracts of the 22nd Int'l Conference on Solid State Devices and Materials, Sendai, (1990) 853-856.

(Continued)

*Primary Examiner*—Armando Rodriguez
(74) *Attorney, Agent, or Firm*—Dickstein Shapiro LLP (57) ABSTRACT

A multi-layered reflective mirror formed of spaced-apart plate-shaped empty space patterns formed within a substrate is disclosed. The plurality of plate-shaped empty space patterns are formed by drilling holes in the substrate and annealing the substrate to form the spaced-apart plate-shaped empty space patterns.

23 Claims, 6 Drawing Sheets

U.S. PATENT DOCUMENTS

| | | |
|---|---|---|
| 5,443,661 A | 8/1995 | Oguro et al. |
| 5,461,243 A | 10/1995 | Ek et al. |
| 5,471,180 A | 11/1995 | Brommer et al. |
| 5,526,449 A | 6/1996 | Meade et al. |
| 5,527,739 A | 6/1996 | Parrillo et al. |
| 5,599,745 A | 2/1997 | Reinberg |
| 5,639,684 A | 6/1997 | Kwok |
| 5,646,053 A | 7/1997 | Schepis |
| 5,661,044 A | 8/1997 | Holland et al. |
| 5,691,230 A | 11/1997 | Forbes |
| 5,739,796 A | 4/1998 | Jasper et al. |
| 5,759,898 A | 6/1998 | Ek et al. |
| 5,773,152 A | 6/1998 | Okonogi |
| 5,789,859 A | 8/1998 | Watkins et al. |
| 5,798,559 A | 8/1998 | Bothra |
| 5,811,870 A | 9/1998 | Bhattacharyya et al. |
| 5,834,824 A | 11/1998 | Shepherd et al. |
| 5,840,590 A | 11/1998 | Myers, Jr. et al. |
| 5,858,869 A | 1/1999 | Chen et al. |
| 5,866,204 A | 2/1999 | Robbie et al. |
| 5,879,996 A | 3/1999 | Forbes |
| 5,903,041 A | 5/1999 | La Fleur et al. |
| 5,953,625 A | 9/1999 | Bang |
| 5,962,910 A | 10/1999 | Hawley et al. |
| 5,963,817 A | 10/1999 | Chu et al. |
| 5,969,983 A | 10/1999 | Thakur et al. |
| 5,973,380 A | 10/1999 | Cutter et al. |
| 5,994,776 A | 11/1999 | Fang et al. |
| 5,997,378 A | 12/1999 | Dynka et al. |
| 5,999,308 A | 12/1999 | Nelson et al. |
| 6,001,711 A | 12/1999 | Hashimoto |
| 6,013,970 A | 1/2000 | Nishiwaki et al. |
| 6,016,000 A | 1/2000 | Moslehi |
| 6,016,001 A | 1/2000 | Sanchez et al. |
| 6,022,793 A | 2/2000 | Wijaranakula et al. |
| 6,054,808 A | 4/2000 | Watkins et al. |
| 6,057,224 A | 5/2000 | Bothra |
| 6,069,064 A | 5/2000 | Cutter et al. |
| 6,075,640 A | 6/2000 | Nelson |
| 6,077,792 A | 6/2000 | Farrar |
| 6,083,324 A | 7/2000 | Henley et al. |
| 6,084,814 A | 7/2000 | Casper et al. |
| 6,088,282 A | 7/2000 | Loughmiller et al. |
| 6,093,623 A | 7/2000 | Forbes |
| 6,093,624 A | 7/2000 | Letavic et al. |
| 6,097,077 A | 8/2000 | Gordon et al. |
| 6,113,758 A | 9/2000 | De Nora et al. |
| 6,127,777 A | 10/2000 | Watkins et al. |
| 6,136,666 A | 10/2000 | So |
| 6,139,626 A | 10/2000 | Norris et al. |
| 6,146,925 A | 11/2000 | Dennison |
| 6,172,456 B1 | 1/2001 | Cathey et al. |
| 6,174,784 B1 | 1/2001 | Forbes |
| 6,202,065 B1 | 3/2001 | Wills |
| 6,204,145 B1 | 3/2001 | Noble |
| 6,206,065 B1 | 3/2001 | Robbie et al. |
| 6,228,694 B1 | 5/2001 | Doyle et al. |
| 6,239,187 B1 | 5/2001 | Hatke et al. |
| 6,248,422 B1 | 6/2001 | Robbie et al. |
| 6,251,751 B1 | 6/2001 | Chu et al. |
| 6,252,293 B1 | 6/2001 | Seyyedy et al. |
| 6,255,156 B1 | 7/2001 | Forbes et al. |
| 6,261,876 B1 | 7/2001 | Crowder et al. |
| 6,274,460 B1 | 8/2001 | Delgado et al. |
| 6,277,728 B1 | 8/2001 | Ahn |
| 6,284,675 B1 | 9/2001 | Jin et al. |
| 6,288,437 B1 | 9/2001 | Forbes et al. |
| 6,291,871 B1 | 9/2001 | Dennison |
| 6,309,950 B1 | 10/2001 | Forbes |
| 6,315,826 B1 | 11/2001 | Muramatsu |
| 6,323,536 B1 | 11/2001 | Cutter et al. |
| 6,338,805 B1 | 1/2002 | Anderson |
| 6,339,011 B1 | 1/2002 | Gonzalez et al. |
| 6,344,373 B1 | 2/2002 | Bhattacharyya et al. |
| 6,351,425 B1 | 2/2002 | Porter |
| 6,368,938 B1 | 4/2002 | Usenko |
| 6,376,336 B1 | 4/2002 | Buynoski |
| 6,377,070 B1 | 4/2002 | Forbes |
| 6,383,924 B1 | 5/2002 | Farrar et al. |
| 6,387,824 B1 | 5/2002 | Aoi et al. |
| 6,391,738 B2 | 5/2002 | Moore |
| 6,423,582 B1 | 7/2002 | Fischer et al. |
| 6,423,613 B1 | 7/2002 | Geusic |
| 6,424,001 B1 | 7/2002 | Forbes et al. |
| 6,436,187 B1 | 8/2002 | Patel et al. |
| 6,444,534 B1 | 9/2002 | Maszara |
| 6,444,558 B1 | 9/2002 | Cutter et al. |
| 6,448,601 B1 | 9/2002 | Forbes et al. |
| 6,452,713 B1 | 9/2002 | White |
| 6,456,149 B2 | 9/2002 | Cutter et al. |
| 6,458,630 B1 | 10/2002 | Daubenspeck et al. |
| 6,461,933 B2 | 10/2002 | Houston |
| 6,478,883 B1 | 11/2002 | Tamatsuka et al. |
| 6,495,395 B2 | 12/2002 | Reinberg |
| 6,496,034 B2 | 12/2002 | Forbes et al. |
| 6,498,056 B1 | 12/2002 | Motsiff et al. |
| 6,509,623 B2 | 1/2003 | Zhao |
| 6,525,399 B2 | 2/2003 | Cutter et al. |
| 6,531,727 B2 | 3/2003 | Forbes et al. |
| 6,538,330 B1 | 3/2003 | Forbes |
| 6,541,356 B2 | 4/2003 | Fogel et al. |
| 6,541,811 B2 | 4/2003 | Thakur et al. |
| 6,542,682 B2 | 4/2003 | Cotteverte et al. |
| 6,559,491 B2 | 5/2003 | Forbes et al. |
| 6,566,682 B2 | 5/2003 | Forbes |
| 6,579,738 B2 | 6/2003 | Farrar et al. |
| 6,582,512 B2 | 6/2003 | Geusic et al. |
| 6,583,437 B2 | 6/2003 | Mizuno et al. |
| 6,589,334 B2 | 7/2003 | John et al. |
| 6,593,625 B2 | 7/2003 | Christiansen et al. |
| 6,597,203 B2 | 7/2003 | Forbes |
| 6,630,713 B2 | 10/2003 | Geusic |
| 6,630,724 B1 | 10/2003 | Marr |
| 6,649,476 B2 | 11/2003 | Forbes |
| 6,656,822 B2 | 12/2003 | Doyle et al. |
| 6,657,277 B1 | 12/2003 | Hsieh |
| 6,674,667 B2 | 1/2004 | Forbes |
| 6,740,913 B2 | 5/2004 | Doyle et al. |
| 6,898,362 B2 | 5/2005 | Forbes et al. |
| 6,929,984 B2 | 8/2005 | Forbes et al. |
| 6,943,065 B2 | 9/2005 | Bhattacharyya et al. |
| 2002/0001965 A1 | 1/2002 | Forbes |
| 2002/0048968 A1 | 4/2002 | Ahn |
| 2002/0062782 A1 | 5/2002 | Norris et al. |
| 2002/0070419 A1 | 6/2002 | Farrar et al. |
| 2002/0070421 A1 | 6/2002 | Ashburn |
| 2002/0076896 A1 | 6/2002 | Farrar et al. |
| 2002/0079557 A1 | 6/2002 | Ahn et al. |
| 2002/0175330 A1 | 11/2002 | Geusic et al. |
| 2002/0182837 A1 | 12/2002 | Daubenspeck et al. |
| 2002/0185686 A1 | 12/2002 | Christiansen et al. |
| 2003/0027406 A1 | 2/2003 | Malone |
| 2003/0042534 A1 | 3/2003 | Bhattacharyya |
| 2003/0042627 A1 | 3/2003 | Farrar et al. |
| 2003/0071324 A1 | 4/2003 | Motsiff et al. |
| 2003/0075438 A1 | 4/2003 | Dalmia et al. |
| 2003/0131782 A1 | 7/2003 | Geusic et al. |
| 2003/0133683 A1 | 7/2003 | Forbes et al. |
| 2003/0157780 A1 | 8/2003 | Farrar et al. |
| 2003/0181018 A1 | 9/2003 | Geusic et al. |
| 2003/0190796 A1 | 10/2003 | Geusic |
| 2003/0201468 A1 | 10/2003 | Christiansen et al. |
| 2003/0218189 A1 | 11/2003 | Christiansen et al. |
| 2003/0227072 A1 | 12/2003 | Forbes |

| | | | |
|---|---|---|---|
| 2004/0171196 | A1 | 9/2004 | Walitzki |
| 2004/0176483 | A1 | 9/2004 | Geusic |
| 2004/0266220 | A1 | 12/2004 | Ahn et al. |
| 2005/0017273 | A1 | 1/2005 | Forbes et al. |
| 2005/0020094 | A1 | 1/2005 | Forbes et al. |
| 2005/0023638 | A1 | 2/2005 | Bhattacharyya et al. |
| 2005/0029501 | A1 | 2/2005 | Geusic et al. |
| 2005/0029683 | A1 | 2/2005 | Forbes et al. |
| 2005/0070036 | A1 | 3/2005 | Geusic et al. |
| 2005/0089292 | A1 | 4/2005 | Kinoshita |
| 2005/0105869 | A1 | 5/2005 | Forbes et al. |
| 2005/0250274 | A1 | 11/2005 | Forbes et al. |

FOREIGN PATENT DOCUMENTS

| | | |
|---|---|---|
| EP | 1 030 196 | 8/2000 |
| EP | 1 085 352 | 3/2001 |
| JP | 2001-93887 A | 4/2001 |
| WO | WO 98/35248 | 8/1998 |
| WO | WO 02/097982 | 12/2002 |

OTHER PUBLICATIONS

Abelmann, Leon; Lodder, C., Oblique evaporation and surface diffusion, Thin Solid Films 305 (1997) 1-21.

Asoh, Hidetaka; Nishio, K.; Nakao, M.; Yokoo, A.; Tamaura, T.; Masuda, H., Fabrication of ideally ordered anodic porous alumina with 63 nm hole periodicity using sulfuric acid, J. Vac. Sci. Technol. B 19(2) Mar./Apr. (2001) 569-572.

Auberton-Herve, A.J., SOI: Materials to Systems, Int'l Electron Devices Meeting, Technical Digest (1996) 3-10.

Autumn, Kellar; Liang, Y.A.; Hsieh, S.T.; Zesch, W.; Chan, W.P.; Kenny, T.W.; Fearing, R.; Full, R.J., Adhesive force of a single gecko foot-hair, Nature, 405, Jun. 8, 2000, 681-685.

Autumn, Kellar; Sitti, M.; Liang, Y.A.; Peattie, A.M.; Hansen, W.R.; Sponberg, S.; Kenny, T.W.; Fearing, R.; Israelachvili, J.N.; Full, R.J., Evidence for van der Waals adhesion in gecko setae, Proc. of the National Academy of Science, 99(19) Sep. 17, 2002, 12252-12256.

Baginski, Thomas A., Back-side Germanium Ion Implantation Gettering of Silicon, J. Electrochem. Soc.: Solid-State Science and Technology, 135(7) Jul. 1988, 1842-1843.

Banhart, John, Manufacture, characterization and application of cellular metals and metal foams, Progress in Materials Science 46 (2001) 559-632.

Banhart, John; Weaire, D., On the Road Again: Metal Foams Find Favor, Physics Today, Jul. 2002, 37-42.

Beauvais, Jacques; Lavallee, E.; Drouin, D.; Turcotte, D., Nano-Imprint Lithography Using Materials Fabricated by Sidwell Process, J. Vac. Sci. Technol. B, 17, 2957 (1999).

Belford, Rona E.; Zhao, W.; Potashnik, J.; Liu, Q.; Seabaugh, A., Performance-Augmented CMOS Using Back-End Uniaxial Strain, IEEE 60th DRC., Conference Digest, 2002, 41-42.

Berti, M.; Mazzi, G.; Calagnile, L.; Drigo, A.V.; Merli, P.G.; Migliori, A., Composition and structure of Si-Ge layers produced by ion Implantation and laser melting, J. Mater. Res., 6(10) Oct. 1991, 2120-2126.

Berti, M.; Mazzi, G.; Drigo, A.V.; Migliori, A.; Jannitti, E.; Nicoletti, S., Laser induced epitaxial regrowth of $Si_{1-x}Ge_x$/Si layers produced by Ge ion implantation, Applied Surface Science 43 (1989) 158-164.

Bhattacharyya, A.; Bass, R.; Tice, W.; Baxter, R.; Derenthal, T., Physical and Electrical Characteristics of LPCVD Si-Rich Nitride, J. Electrochem. Soc., 131(11) 469C.

Bialas, F.; Winkler, R.; Dietrich, H., Intrinsic gettering of 300 mm CZ wafers, Microelectronic Engineering 56 (2001) 157-163.

Binns, M.J.; Banerjee, A.; Wise, R.; Myers, D.J.; McKenna, T.A., The Realization of Uniform and Reliable Intrinsic Gettering in 200mm p- and p/p- Wafers for a Low Thermal Budget 0.18μm Advanced CMOS Logic Process, Solid State Phenomena, vols. 82-84 (2002) 387-392.

Birner, A.; Gruning, U.; Ottow, S.; Schneider, A.; Muller, F., Lehmann, V.; Foll, H.; Gosele, U., Macroporous Silicon: A Two-Dimensional Photonic Bandgap Material Suitable for the Near-Infrared Spectral Range, Phys. Stat. Sol. (a) 165 (1998) 111-117.

Birner, Albert; Wehrspohn, R.B.; Gosele, U.M.; Busch, K., Silicon-Based Photonic Crystals, Adv. Mater. 13(6) Mar. 16, 2001, 377-388.

Blanco, Alvaro, et al., Large-scale synthesis of a silicon photonic crystal with a complete three-dimensional bandgap near 1.5 micrometres, Nature, 405, May 25, 2000, 437-440.

Blanford, Christopher; Yan, H.; Schroden, R.C.; Al-Daous, M.; Stein, A., Gems of Chemistry and Physics: Macroporous Metal Oxides with 3D Order, Adv. Mater. 13(6) Mar. 16, 2001, 401-407.

Bronner, Gary; Plummer, J.D.; Physical Modeling of Backside Gettering, Mat. Res. Soc. Symposia Proceedings vol. 36, Boston, Nov. 27-30, 1984, 49-54.

Brown, Chappell, Bonding twist hints at universal substrate, EETimes (1997) 2 pgs.

Bruel, Michel; Aspar, B.; Auberton-Herve, A.-J., Smart-Cut: A New Silicon On Insulator Material Technology Based on Hydrogen Implanatation and Wafer Bonding, Jpn. J. Appl. Phys., vol. 36 (Mar. 1997) Pt. 1, No. 3B, 1636-1641.

CRC Handbook of Chemistry and Physics, 49th ed. (c1968) The Chemical Rubber Pub. Co., Cleveland, OH, E-61.

Chen, Xiangdong; Ouyang, Q.; Liu, K.-C.; Shi, Z.; Tasch, A.; Banerjee, S., Vertical P-MOSFETS with heterojunction between source/drain and channel, 58th Device Research Conference Digest, Jun. 19-21, 2000, Denver, CO, 25-26.

Chilton, B.T.; Robinson, B.J.; Thompson, D.A.; Jackman, T.E.; Baribeau, J.-M., Solid phase epitaxial regrowth of $Si_{1-x}Ge_x$/Si strained-layer structures amorphized by ion implantation, Appl. Phys. Lett. 54(1) Jan. 2, 1989, 42-44.

Choe, K.S.; Jang, B.N., Minority-carrier lifetime optimization in silicon MOS devices by intrinsic gettering, J. of Cryst. Growth 218 (2000) 239-240.

Chou, Stephen Y.; Krauss, P.R., Imprint Lithography with Sub-10 nm Feature Size and High Throughput, Microelectronic Engineering 35 (1997) 237-240.

Chou, Stephen Y.; Krauss, P.R.; Zhang, W.; Guo, L.; Zhuang, L., Sub-10 nm imprint lithography and applications, J. Vac. Sci. Technol. B 15(6) Nov./Dec. 1997, 2897-2904.

Clark, Don, Intel Unveils New Technology For Creating Tiny Transistors, The Wall Street Journal, Aug. 13, 2002, P.1.

Clifton, P.A.; Routley, P.R.; Gurry, P.K.; O'Neill, A.G.; Carter, J.A.; Kemhadjian, H.A., A Process for Strained Silicon n-Channel HMOSFETS, Proc. of the 26th European Solid State Device Research Conference, Sep. 9-11, 1996, Bologna, Italy, 519-522.

Colgan, M.J.; Brett, M.J., Field emission from carbon and silicon films with pillar microstructure, Thin Solid Films 389 (2001) 1-4.

Cornell Demonstrates a Universal Substrate, Compound Semiconductor Mar./Apr. 1997, 3(2) 27.

Das, B.; McGinnis, S.; Miller, A., Template Based Semiconductor Nanostructure Fabrication and their Applications, Invited Paper, 11th International Workshop in the Physics of Semiconductor Devices (2001) D.1.1.

Devasahayam, Adrian J.; Agatic, I.; Zaritsky, I.; Druz, B.; Hegde, H.; Das, S.R.; LaFramboise, S., Material Properties of Ion Beam Deposited Oxides for the Opto-Electronic Industry, 10th Canadian Semiconductor Technology Conference, Ottawa, Aug. 13-17, 2001, Th1. 3, 185.

Dubbleday, Wadad B.; Kavanagh, K.L., Oscillatory Strain Relaxation in Solid Phase Epitaxially Regrown Silicon on Sapphire, Lattice Mismatched Thin Films, E.A. Fitzgerald, Ed., The Minerals, Metals & Materials Society Pub., c1999, 13-17.

Edrington, Alexander C., et al., Polymer-Based Photonic Crystals, Adv. Mater., 13(6) Mar. 16, 2001, 421-425.

Fischetti, M.V.; Laux, S.E., Band structure, deformation potentials, and carrier mobility in strained Si, Ge, and SiGe alloys, J. Appl. Phys. 80 (4) Aug. 15, 1996, 2234-2252.

Fournel, F.; Moriceau, H.; Aspar, B.; Magnea, N.; Eymery, J.; Rousseau, K.; Rouviere, J.L., Ultra High Precision of the Tilt/Twist Misorientation Angles in Silicon/Silicon Direct Wafer Bonding, Electronic Materials Conference Abstract, Jun. 2002, 9.

Garcia, G.A.; Reedy, R.E.; Burgener, M.L., High-Quality CMOS in Thin (100 nm) Silicon on Sapphire, IEEE Electron Device Letters, 9(1) Jan. 1988, 32-34.

Godbole, H.; Haddad, H.; Forbes, L., An investigation of bulk stacking faults in silicon using photocapacitance transient spectroscopy, Materials Letters, 8 (6, 7) Jul. 1989, 201-203.

Gong, S.S.; Schroder, D.K., Implantation gettering in silicon, Solid-State Electronics, 30(2) (1987) 209-211.

Graf, D.; Lambert, U.; Schmolke, R.; Wahlich, R.; Siebert, W.; Daub, E.; Ammon, W.V., 300 mm EPI PP- wafer: Is there sufficient gettering?, Electrochemical Soc. Proc. vol. 2000-17, 319-330.

Haddad, H.; Forbes, L.; Burke, P.; Richling, W., Carbon Doping Effects on Hot Electron Trapping, IEEE Electron Devices Soc. 28th Ann. Proc. Mar. 27-29, 1990, New Orleans, LA, 288-289.

Haddad, H.; Forbes, L., Electrical activity of bulk stacking faults in silicon, Materials Letters, 7(3) Sep. 1988, 99-101.

Harendt, C.; Hunt, C.; Appel, W.; Graf, H.-G., Hofflinger, B.; Penteker, E., Silicon on Insulator Material by Wafer Bonding, J. Electronic Materials, 20(3) Mar. 1991, 267-277.

Ho, K.M.; Chan, C.T.; Soukoulis, C.M., Existence of a Photonic Gap in Periodic Dielectric Structures, Phys. Rev. Lett., 65(25) Dec. 17, 1990, 3152-3155.

Holland, Brian T.; Blanford, C.F.; Stein, A., Synthesis of Macroporous Minerals with Highly Ordered Three-Dimensional Arrays of Spheroidal Voids, Science, 281 Jul. 24, 1998, 538-540.

Iyer, S. Sundar Kumar, et al., Separation by Plasma Implantation of Oxygen (SPIMOX) Operational Phase Space, IEEE Transactions on Plasma Science, 25(5) Oct. 1997, 1128-1135.

Jeng, Shin-Puu; Chang, M.-C.; Kroger, T.; McAnally, P.; Havemann, R.H., A Planarized Multilevel Interconnect Scheme With Embedded Low-Dielectric-Constant Polymers For Sub-Quarter-Micron Applications, 1994 Symposium on VLSI Technology Digest of Technical Papers, 73-74.

Jiang, Peng; Ostojic, G.N.; Narat, R.; Mittleman, D.M.; Colvin, V.L., The Fabrication and Bandgap Engineering of Photonic Multilayers, Adv. Mater. 13(6) Mar. 16, 2001, 389-393.

Jin, C.; Lin, S.; Wetzel, J.T., Evaluation of Ultra-Low-k Dielectric Materials for Advanced Interconnects, J. Electronic Materials, 30(4) 2001, 284-289.

Joannopoulos, John D., Meade, R.D., Winn, J.N., Photonic Crystals, Molding the Flow of Light, c1995, Princeton University Press, Princeton, NJ, 6.

John, Sageev; Busch, K., Photonic Bandgap Formation and Tunability in Certain Self-Organizing Systems, J. Lightwave Technology, 17(11) Nov. 1999, 1931-1943.

Johnson, Steven G.; Fan, S.; Villeneuve, P.R.; Joannopoulos, J.D.; Kolodziejski, L.A., Guided modes in photonic crystal slabs, Phys. Rev. B, 60(8), Aug. 15, 1999, 5751-5758.

Jurczak, M., et al., SON (Silicon On Nothing)—A New Device Architecture for the ULSI Era, 1999 Symposium on VLSI Technology Digest of Papers, 29-30.

Kalavade, Pranav; Saraswat, K.C., A Novel sub-10nm Transistor, 58th DRC, Conf. Dig. Jun. 19-21, 2000, 71-72.

Kang, J.S.; Schroder, D.K., Gettering in silicon, J. Appl. Phys., 65(8) Apr. 15, 1989, 2974-2985.

Karunasiri, R.P.U.; Bruinsma, R.; Rudnik, J., Thin-Film Growth and the Shadow Instability, Phys. Rev. Lett., 62(7) Feb. 13, 1989, 788-791.

Kingery, W.D., Introduction to Ceramics, (c1963), John Wiley & Sons, Inc., New York, 262-263.

Kittel, Charles, Introduction to Solid State Physics, 3rd ed., (c1966) John Wiley & Sons, Inc., New York, 25.

Kostrzewa, M., et al., Testing the Feasibility of Strain Relaxed Compliant Substrates, EMC 2003 Int'l Conf. Indium Phosphide and Related Materials, Jun. 8.

Kung, C.Y.; Forbes, L.; Peng, J.D., The effect of carbon on oxygen precipitation in high carbon CZ silicon cystals, Mat. Res. Bull., vol. 18, 1983, 1437-1441.

Lasky, J.B., Wafer bonding for silicon-on-insulator technologies, Appl. Phys. Lett., 48(1) Jan. 6, 1986, 78-80.

Li, Zhi-Yuan; Zhang, Z.-Q., Photonic Bandgaps in Disordered Inverse-Opal Photonic Crystals, Adv. Mater. 13(6) Mar. 16, 2001, 433-436.

Li, Y.X.; Liu, C.C.; Guo, H.Y.; Wang, X.; Pan, M.X.; Xu, Y.S.; Yang, D.R.; Que, D.L., New Intrinsic Gettering Process in Czochralski-silicon Wafer, 2001 6th Int'l Conf. on Solid-State and Integrated-Circuit Technology Proc., vol. 1, Oct. 22-25, Shanghai, CN, 277-279.

Lin, Shawn-Yu; Fleming, J.G., A Three-Dimensional Optical Photonic Crystal, J. Lightwave Technol., 17(11) Nov. 1999, 1944-1947.

Loncar, Marko; Nedeljkovic, D.; Doll, T.; Vuckovic, J.; Scherer, A.; Pearsall, T.P., Waveguiding in planar crystals, Appl. Phys. Lett., 77(13) Sep. 25, 2000, 1937-1939.

Loo, Y.-L.; Willett, R.L.; Baldwin, K.W.; Rogers, J.A., Contact printing with nanometer resolution, 60th DRC, Jun. 24-26, 2002, Santa Barbara, CA, 149-150.

Lu, Deren; Wortman, J.J.; Fathy, D., Bonding silicon wafers by use of electrostatic fields followed by rapid thermal heating, Materials Letters, 4(11,12) Oct. 1986, 461-464.

Lu, Yu, Yin, Y.; Xia, Y., Three-Dimensional Photonic Crystals with Non-spherical Colloids as Building Blocks, Adv. Mater., 13(6) Mar. 16, 2001, 415-420.

Malac, Marek; Brett, M., Thin Films Deposited at Glancing Incidence and their Applications, Vacuum Technology & Coating, Jul. 2001, 48-53.

Manoharan, Vinothan N.; Imhof, A.; Thorne, J.D.; Pine, D.J., Photonic Crystals from Emulsion Templates, Adv. Mater., 13(6) Mar. 16, 2001, 447-450.

Messier, R.; Gehrke, T.; Frankel, C.; Venugopal, V.C.; Otano, W.; Lakhtakia, A., Engineered sculptured nematic thin films, J. Vac. Sci. Technol. A 15(4) Jul./Aug. 1997, 2148-2152.

Miguez, Hernan; Meseguer, F.; Lopez, C.; Lopez-Tejeira, F.; Sanchez-Dehesa, J., Synthesis and Photonic Bandgap Characterization of Polymer Inverse Opals, Adv. Mater., 13(6) Mar. 16, 2001, 393-396.

Mitsutake, Kunihiro; Ushiku, Y., Theoretical Study on the Formation Process of Empty Space in Silicon (ESS), 2000 Int'l Conf. on Solid-State and Integrated Circuit Technol., 198-199.

Mizuno, T.; Sugiyama, N.; Satake, H.; Takagi, S., Advanced SOI-MOSFETS with Strained-Si Channel for High Speed CMOS-Electron /Hole Mobility Enhancement, 2000 Symposium on VLSI Technol., Digest of Technical Papers, 210-211.

Mizushima, I.; Sato, T.; Taniguchi, S.; Tsunashima, Y., Empty-space-in-silicon technique for fabricating a silicon-on-nothing structure, Appl. Phys. Lett., 77(20) Nov. 13, 2000, 3290-3292.

Morey, George W., The Properties of Glass, 2nd ed., c1954, Reinhold Pub. Corp., New York, 12, 48-49.

Mumola,, P.B.; Gardopee, G.J.; Mathur, D.P.; Siniaguine, O., Recent advances in thinning of bonded SOI wafers by plasma assisted chemical etching, Proc.of the 3rd Int'l Symposium on Semiconductor Wafer Bonding: Physics and Applications, The Electrochemical Soc., 1995, vols. 95-7, 28-32.

Nayak, D.K.; Park, J.S.; Woo, J.C.S.; Wang, K.L.; Yabiku, G.K.; MacWilliams, K.P., High Performance GeSi Quantum-Well PMOS on SIMOX, 1992 Int'l Electron Devices Meeting, 1992, 777-780.

New Scientist.com, Secret of 'strained silicon' chips revealed, Dec. 17, 2003, http://www.newscientist.com/news/print.jsp?id=ns999944923 2 pages.

Ni, Peigen; Dong, P.; Cheng, B.; Li, X.; Zhang, D., Synthetic $SiO_2$ Opals, Adv. Mater., 13(6) Mar. 16, 2001, 437-441.

Norris, David J.; Vlasov, Y.A., Chemical Approaches to Three-Dimensional Semiconductor Photonic Crystals, Adv. Mater., 13(6) Mar. 16, 2001, 371-376.

Omi, Hiroo; Bottomley, D.; Ogino, T., Semiconductor Surface with Strain Control, http://www.brl.ntt.co.jp/J/kouhou/katsudou/report00/E/report04_e.html one page.

O'Neill, A.G.; Antoniadis, D.A., High speed deep sub-micron MOSFET using high mobility strained silicon channel, Proc. of the 25th European Solid State Device Res. Conf., Sep. 25-27, 1995, The Hague, NL, 110-112.

Or, B.S.S.; Forbes, L.; Haddad, H.; Richling, W., Annealing Effects of Carbon in n-Channel LDD MOSFETS's, IEEE Electron Device Letters, 12(11) Nov. 1991, 596-598.

Ouyang, Q.; Chen, X.D.; Mudanai, S.; Kencke, D.L.; Tasch, A.F.; Banerjee, S.K., Bandgap Engineering in Deep Submicron Vertical pMOSFETSs, 58th DRC, Conf. Digest, Jun. 19-21, 2000, 27-28.

Paine, D.C.; Howard, D.J.; Stoffel, N.G.; Horton, J.A., The growth of strained $Si_{1-x}Ge_x$ alloys on (001) silicon using solid phase epitaxy, J. Mater. Res., 5(5) May 1990, 1023-1031.

Pandya, D.K.; Rastogi, A.C.; Chopra, K.L., Obliquely deposited amorphous Ge films. 1. Growth and structure, J. Appl. Phys., 46(7) Jul. 1975, 2966-2975.

People, R.; Bean, J.C., Calculation of critical layer thickness versus lattice mismatch for $Ge_xSi_{1-x}$/Si strained-layer heterostructures, Appl. Phys. Lett., 47(3) Aug. 1, 1995, 322-324 (Erratum attached).

Rim, Kern; Hoyt, J.L.; Gibbons, J.F., Fabrication and Analysis of Deep Submicron Strained-Si N-MOSFET's, IEEE Transactions on Electron Devices, 47(7) Jul. 2000, 1406-1415.

Rim, K, et al., Strained Si NMOSFETs for High Performance CMOS Technology, 2001 Symposium on VLSI Technol., Digest of Technical Papers, 59-60.

Rim, Kern; Hoyt, J.L.; Gibbons, J.F., Transconductance Enhancement in Deep Submicron Strained-Si $n$-MOSFETs, Int'l Electron Devices Meeting 1998, Technical Digest, 707-710.

Robbie, K.; Brett, M.J., Sculptured thin films and glancing angle deposition: Growth mechanics and applications, J. Vac. Sci. Technol. A 15(3) May/Jun. 1997, 1460-1465.

Rubin, Leonard; Pech, R.; Huber, D.; Brunner, J.; Morris, W., Effective Gettering of Oxygen by High Dose, High Energy Boron Buried Layers, 1998 Int'l Conf. on Ion Implantation Technol. Proc., Kyoto, JP, Jun. 22-26, 1010-1013.

Sato, Tsutomu, et al., Trench Transformation Technology using Hydrogen Annealing for Realizing Highly Reliable Device Structure with Thin Dielectric Films, 1998 Symp. on VLSI Technol., Digest of Technical Papers, 206-207.

Smith, C.J.M., et al., Low-loss channel waveguides with two-dimensional photonic crystal boundaries, Appl. Phys. Lett., 77(18) Oct. 30, 2000, 2813-2815.

Subramania, Ganapathi; Constant, K.; Biswas, R.; Sigalas. M.M.; Ho, K.-M., Inverse Face-Centered Cubic Thin Film Photonic Crystals, Adv. Mater. 13(6) Mar. 16, 2001, 443-446.

Sugiyama, N.; Mizuno, T.; Takagi, S.; Koike, M.; Kurobe, A., Formation of strained-silicon layer on thin relaxed-SiGe/$SiO_2$/Si structure using SIMOX technology, Thin Solid Films, 369 (2000) 199-202.

Tait, R.N.; Smy, T.; Brett, M.J., Modelling and characterizations of columnar growth in evaporated films, Thin Solid Films, 236 (1993) 196-201.

Takagi, Shin-ichi, Strained-Si- and SiGe-On-Insulator (Strained-SOI and SGOI) MOSFETs for High Performance/Low Power CMOS Application, IEEE 60th DRC, Conf. Digest (2002) 37-40.

Tessier, P.M.; Velev, O.D.; Kalambur, A.T.; Lenhoff, A.M.; Rabolt, J.F.; Kaler, E.W., Structured Metallic Films for Optical and Spectroscopic Applications via Colloidal Crysal Templating, Adv. Mater. 13(6) Mar. 16, 2001, 396-400.

Thornton, John A., High Rate Thick Film Growth, Ann. Rev. Mater. Sci., 7 (1977) 239-260.

Treichel, H., Low Dielectric Constant Materials, J. Electronic Mater., 30(4) 2001, 290-298.

Verdonckt-Vandebroek, Sophie, et al., SiGe-Channel Heterojunction $p$-MOSFET's, IEEE Transactions on Electron Devices, 41(1) Jan. 1994, 90-101.

Welser, J.; Hoyt, J.L.; Takagi, S.; Gibbons, J.F., Strain Dependence of the Performance Enhancement in Strained-Si $n$-MOSFETs, IEEE Int'l Electron Devices Meeting, Technical Digest, Dec. 11-14, 1994, 373-376.

Whitwer, F.D.; Haddad, H.; Forbes, L., DLTS Characterization of Precipitation Induced Microdefects, Mat. Res. Soc. Symp. Proc. 71, Apr. 1986, 53-57.

Wijaranakula, W.; Burke, P.M.; Forbes, L.; Matlock, J.H., Effect of pre- and postepitaxial deposition annealing on oxygen precipitation in silicon, J. Mater. Res. 1(5) Sep./Pct 1986, 698-704.

Wijaranakula, W.; Burke, P.; Forbes, L.; Matlock, J.H., Effect of Preanneal Heat Treatment on Precipitation in Epitaxial Silicon, Mat. Res. Soc. Symp. Proc., 71, Apr. 1986, 139-144.

Wijaranakula, W.; Burke, P.M.; Forbes, L., Internal gettering heat treatments and oxygen precipitation in epitaxial silicon wafers, J. Mater. Res., 1(5) Sep./Oct. 1986, 693-697.

Wijaranakula, W.; Matlock, J.H.; Mollenkopf, H.; Burke, P.; Forbes, L.,Oxygen Precipitation in P/P+(100) Epitaxial Silicon Material, J. Electrochemical Soc., 134(9) Sep. 1987, 2310-2316.

Wild, M., Laser Assisted Bonding of Silicon and Glass in Micro-System Technology, (2003) http://www.ilt.fraunhofer.de/ilt/php/default.php?id=100265&lan=eng&dat=2 one page.

Wolcik, J.; Simionescu, C.G.; Lennard, W.N.; Haugen, H.K.; Davies, J.A.; Mascher, P., Characterization of Silicon Oxynitride Thin Films Deposited by ECR-PECVD, 10th Canadian Semiconductor Technology Conf., Aug. 13-17, 2001, 184.

Xia, Younan, Photonic Crystals, Adv. Mater., 13(6) Mar. 16, 2001, 369.

Xia, Younan; Gates, B.; Li, Z.-Y., Self-Assembly Approaches to Three-Dimensional Photonic Crystals, Adv. Mater. 13(6) Mar. 16, 2001, 409-413.

Xuan, Peiqi; Kedzierski, J.; Subranmanian, V.; Bokor, J.; King, T.-J., Hu, C., 60nm Planarized Ultra-thin Body Solid Phase Epitaxy MOSFETs, IEEE 58th DRC Meeting. Conf. Digest, Jun. 19-21, 2001, 67-68.

Yablonovitch, Eli, Inhibited Spontaneous Emission in Solid-State Physics and Electronics, Physical Rev. Lett., 58(20) May 18, 1987, 2059-2062.

Yablonovitch, Eli; Gmitter, T.J.; Leung, K.M., Photonic Band Structure: The Face-Centered-Cubic Case Employing Nonspherical Atoms, Physical Rev. Lett., 67(17) Oct. 21, 1991, 2295-2298.

Yang, Deren; Fan, R.; Shen, Y.; Tian, D.; Li, L.; Que, D., Intrinsic gettering in nitrogen doped Czochralski crystal silicon, Proc. of the 6th Int'l Symp. High Purity Silicon VI, The Electrochemical Soc., Inc., 17, (2000) 357-361.

Yang, Deren; Que, D., Nitrogen in Czochralski Silicon, 6th Int'l Conf. on Solid-State and Integrated Circuit Technol., 1(1) 2001, 255-260.

Yang, Peidong; Rizvi, A.H.; Messer, B.; Chmelka, B.F.; Whitesides, G.M.; Stucky, G.D., Patterning Porous Oxides within Microchannel Networks, Adv. Mater., 13(6) Mar. 16, 2001, 427-431.

Zhang, F., et al., Nanoglass™ E Copper Damascene Processing for Etch, Clean and CMP, IEEE Int'l Interconnect Technol. Conf., (2001) 57-59.

Zhu, Z.H.; Ejeckam, F.E.; Zhang, Z.; Zhang, J.; Qian, Y.; Lo, Y.-H., 10th Ann. Meeting IEEE Lasers and Electro-Optics Soc., Conf. Proc., Nov. 10-13, 1996, 31.

Zhu, Z.-H., et al., Wafer Bonding Technology and Its Applications in Optoelectronic Devices and Materials, IEEE J. Selected Topics in Quantum Electronics, 3(3) Jun. 1997, 927-936.

Rim, Kern; Hoyt, J.L.; Gibbons, J.F., Transconductance Enhancement in Deep Submicron Strained-Si $n$-MOSFETs, Int'l Electron Devices Meeting 1998, Technical Digest, 707-710.

Tan, T.Y.; Gardner, E.E.; Tice, W.K., Intrinsic gettering by oxide precipitate induced dislocations in Czochralski Si, Appl. Phys. Lett., 30(4) Feb. 15, 1977, 175-176.

Yin, Haizhou, et al., High Ge-Content Relaxed $Si_{1-x}GE_x$ Layers by Relaxation on Compliant Substrate with Controlled Oxidation, Electronic Materials Conf., Santa Barbara, CA, Jun. 2002, 8.

"A New Substrate Engineering for the Formation of Empty Space in Silicon (ESS) Induced by Silicon Surface Migration" by Tsutomu Sato, et al., 1999 IEEE, pp. 20.6.1-20.6.4.

"Surface - (Interface-) and Volume-Diffusion Contributions to Morphological Changes Driven by Capillarity" by F.A. Nichols and W.W. Mullins, Transactions of The Metallurgical Society of AIME, vol. 233, Oct. 1965., pp. 1840-1847.

"Principles of Optics", by M Born and E. Wolf, Pergamon Press 1959, pp. 65-69.

METHOD OF FORMING MIRRORS BY SURFACE TRANSFORMATION OF EMPTY SPACES IN SOLID STATE MATERIALS

CROSS REFERENCE TO RELATED APPLICATIONS

The present application is a continuation of U.S. application Ser. No. 09/855,532, filed May 16, 2001, now U.S. Pat. No. 7,142,577 the disclosure of which is herewith incorporated by reference in its entirety.

FIELD OF THE INVENTION

The present invention relates to semiconductor devices and methods of making such devices. More particularly, the invention relates to solid state materials and to a novel method of forming multi-layered dielectric mirrors including empty-spaced patterns formed in such solid materials.

BACKGROUND OF THE INVENTION

Monocrystalline solid state materials such as single-crystal semiconductors are the basis of the current microelectronics industry. Solid state materials are characterized by a variety of properties, for example, electrical properties such as electrical conductivity or charge mobility, optical properties such as refractive index or speed of photons, thermal properties such as thermal conductivity or thermal expansion, mechanical properties such as stress or strain curves, and chemical properties such as resistance to corrosion or reaction consistency, among others.

Over the past years, the semiconductor industry has constantly explored new ways of increasing the amount of active surface area on the integrated circuit chips, particularly on those employing monocrystalline semiconductor substrates. Accordingly, attempts to modify the electrical, optical, thermal and/or mechanical properties of such monocrystalline substrates have been made in an effort to minimize the dimensions of the IC devices, while maximizing the corresponding available active area. For example, new epitaxial growth processes such as the Epitaxial Lateral Overgrowth (ELO) have been used in an attempt to extend the amount of surface area available to active devices. However, these growth processes have limited results mainly because they consume part of the precious surface areas for seeding purposes, defeating therefore the primary purpose of increasing the available active area.

Another technology proposed by the semiconductor industry is the so-called Silicon-On-Insulator (SOI) process, wherein oxygen atoms are implanted at high dose and energy to form a silicon dioxide insulating layer between the upper surface of the original monocrystalline substrate and the bottom bulk portion of the same substrate. Although the SOI devices have many advantages, such as reduced parasitic capacitance due to the buried insulating layer, the process is relatively expensive because of the high costs of implanting the oxygen atoms and curing of the implant-induced defects.

Thin-film technology, including the formation of multi-layered dielectrics, is another highly developed technology in the semiconductor industry, which is widely used for the control of the reflection and/or transmission of light or radiant heat at optical surfaces. When monochromatic light falls on a thin transparent film dielectric having a thickness "d," the light waves reflected from the front and the rear surfaces of the dielectric film interfere. For near-normal incidence, the conditions for a maximum or minimum intensity of the light reflected from such film dielectric depend on the index of refraction of the film dielectric as follows:

$$2nd = (k+\tfrac{1}{2})\lambda \text{ maxima} \qquad (1)$$

and $$2nd = k\lambda \text{ minima} \qquad (2)$$

wherein: n=index of refraction of the dielectric;
λ=wavelength of a monochromatic light entering the dielectric;
d=thickness of the dielectric; and
k=0, 1, 2, . . .

Equations (1) and (2) apply when the index of refraction "n" of the dielectric film is greater or less than the indices of the media on each side of the dielectric. Only in these cases, there will be a relative phase change of 180° for reflections at the two surfaces. A glass plate in air or an air film between two glass plates provide examples of cases to which both equations (1) and (2) apply.

Accordingly, there is a need for an improved method of increasing the available active surface area on integrated circuit chips fabricated on monocrystalline substrates which involve the transmission and/or reflection of light. There is also a need for a more advantageous method of forming dielectric mirrors in monocrystalline semiconducting substrates for low power dissipation, low light losses and high speed optoelectronic devices.

SUMMARY OF THE INVENTION

The present invention provides a method of forming multi-layered dielectric mirrors in light-transmissive substrates, such as, for example, monocrystalline silicon or quartz substrates. According to an exemplary embodiment of the invention, a plurality of buried plate-shaped empty spaces are formed in a light-transmissive substrate. The plurality of such buried plate-shaped regions have indices of refraction greater or less than the index of refraction of the light-transmissive substrate within which they are formed. Particular optical properties of the dielectric mirrors and/or bulk material within which they are formed can be easily tailored by the bulk material and the location, size and number of plate-shaped empty spaces formed therein.

These and other features and advantages of the invention will be more clearly apparent from the following detailed description which is provided in connection with accompanying drawings and which illustrates exemplary embodiments of the invention.

BRIEF DESCRIPTION OF THE DRAWINGS

FIGS. 1(*a*)-(*f*) illustrate a portion of a silicon substrate undertaking a sequence of steps for single sphere-shaped empty space formation.

FIGS. 2(*a*)-(*c*) illustrate a portion of a silicon substrate undertaking a sequence of steps for single pipe-shaped empty space formation.

FIGS. 3(*a*)-(*b*) illustrate a portion of a silicon substrate undertaking a sequence of steps for plate-shaped empty space formation, performed in accordance with a method of forming a multi-layered mirror of the present invention.

DETAILED DESCRIPTION OF THE EMBODIMENTS

In the following detailed description, reference is made to various exemplary embodiments for carrying out the invention. These embodiments are described with sufficient detail to enable those skilled in the art to practice the invention, and it is to be understood that other embodiments may be employed, and that structural, electrical and process changes may be made, and equivalents substituted, without departing from the invention. Accordingly, the following detailed description is exemplary and the scope of the present invention is defined by the appended claims.

The term "substrate" used in the following description includes any light-transmissive material having a uniform structure and a reasonably defined melting temperature. The term "substrate" is to be understood as including substrates formed of silicon, quartz, glass, gallium arsenide, indium gallium arsenide, silicon-on-insulator, doped and undoped semiconductors, epitaxial layers of silicon supported by a base semiconductor foundation, and other semiconductor and dielectric structures, as long as they retain a uniform and/or transparent structure and a defined melting temperature. Furthermore, when reference is made to a substrate in the following description, previous process steps may have been utilized to form regions or junctions in the base semiconductor structure or foundation.

The following discussion illustrates formation of a multi-layer dielectric mirror in a silicon substrate. The invention may be employed with other substrate materials noted, including quartz, and calculations are provided for both silicon and quartz substrates. However, it should be apparent to one skilled in the art that calculations may be used with any substrate having a uniform structural reasonably defined melting temperature.

Referring now to the drawings, where like elements are designated by like reference numerals, FIGS. 4-8 illustrate exemplary embodiments of a multi-layered dielectric mirror 100 comprising plate-shaped empty-spaced patterns formed in accordance with the present invention.

Before discussing the invention with specific reference to FIGS. 4-8, a background discussion of empty-spaced pattern formation in a substrate, such as silicon substrate 10 of FIG. 1, will be described with reference to FIGS. 1-3. Techniques for the formation of empty-spaced patterns of different geometries are described by Sato et al., in *Substrate Engineering for the Formation of Empty Space in Silicon (ESS) Induced by Silicon Surface Migration*, 1999 IEDM Digest, Paper 20.6.1, the disclosure of which is incorporated by reference herein.

Empty spaces which are formed in silicon substrates and have various shapes, such as plates, spheres or pipes, may be formed as a result of the self-organizing migration properties on the silicon surface. As such, when deeply-etched silicon substrates are annealed in a hydrogen ambient, for example, the silicon atoms on the surface migrate so that their surface energy is minimized. Based on these findings, Sato et al. have demonstrated that the geometry of empty spaces, such as spheres, plates and pipes, formed under the surface of a silicon substrate depends on the size, number and spacing of a plurality of cylindrical holes that are initially formed at a low temperature.

For example, FIGS. 1(a)-(f) illustrate how a single sphere-shaped empty space 13 is formed from a single cylindrical hole 12 formed within the silicon substrate 10. Subsequent to the formation of the cylindrical hole 12, the silicon substrate 10 is annealed at a temperature lower than the melting point of monocrystalline silicon (1400° C.), for example, at a temperature of about 1100° C. Sato et al. have demonstrated that, within about 60 seconds and under a reducing ambient of 10 Torr of hydrogen, the shape and surface morphology of the cylindrical hole 12 changes drastically to that of the sphere-shaped empty space 13 (FIG. 1(f)). Because of the significant surface and/or volume diffusion which occurs at high annealing temperatures, the cylindrical hole 12 is unstable beyond a critical length Lc and transforms, therefore, to a lower energy state consisting of one or more empty spheres formed along the original cylinder axis.

As analyzed by Nichols et al., in *Surface- (Interface-) and Volume-Diffusion Contributions to Morphological Changes Driven by Capillarity*, Trans. AIME 233 at 1840 (October 1965), the disclosure of which is incorporated by reference herein, the number N of empty spheres that form from a cylindrical hole depends both on the length L of the cylindrical hole and on the cylinder radius Rc. Accordingly, the number N of empty spheres formed from a cylindrical hole made in a silicon substrate can be estimated according to the following equation:

$$8.89\, Rc\, N \leq L < 8.89\, Rc\, (N+1) \tag{3}$$

wherein: N=number of empty spheres;
Rc=cylinder radius; and
L=length of cylindrical hole.

Thus, equation (3) predicts that, if L<8.89 Rc, the number of empty spheres will be N=0, which means that no empty spheres will form from a cylindrical hole.

When one or more empty spheres form with a radius Rs, then according to Nichols et al., the value of Rs is given by the following equation:

$$Rs = 1.88\, Rc \tag{4}$$

wherein: Rs=sphere radius; and
Rc=cylinder radius.

When two or more empty spheres form from a cylinder hole with a cylinder radius Rc, then the distance l between the centers of two adjacent empty-spaced spheres is calculated from the following formula:

$$l = 8.89\, Rc \tag{5}$$

wherein: l=center-to-center distance between two adjacent spheres; and
Rc=cylinder radius.

Figure 1A:
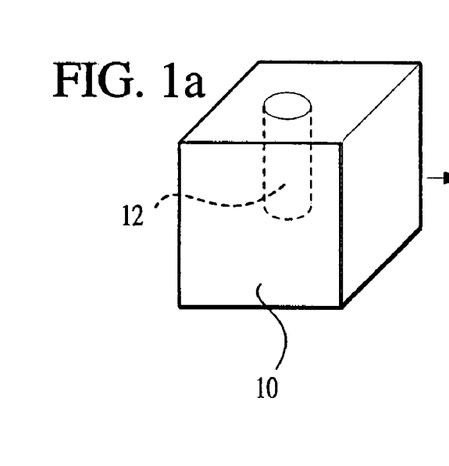
Figure 1B:
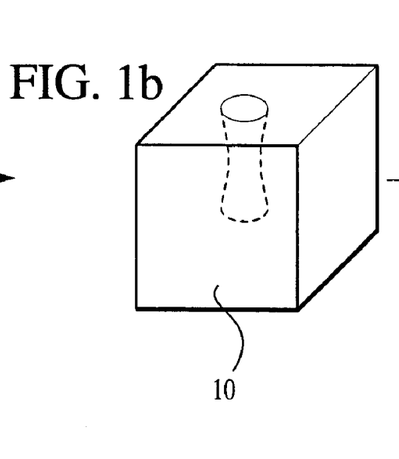
Figure 1C:
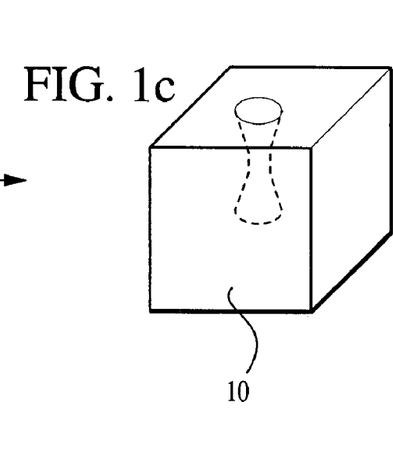
Figure 1D:
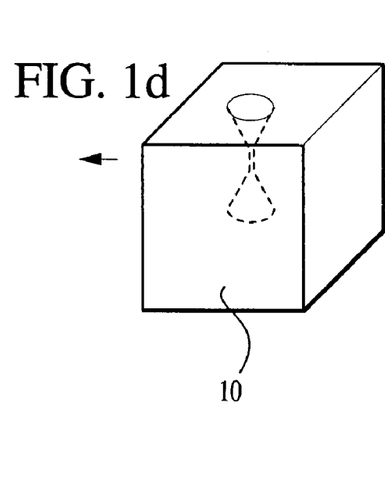
Figure 1E:
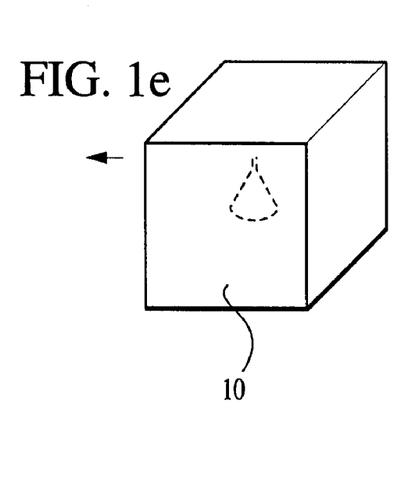
Figure 1F:
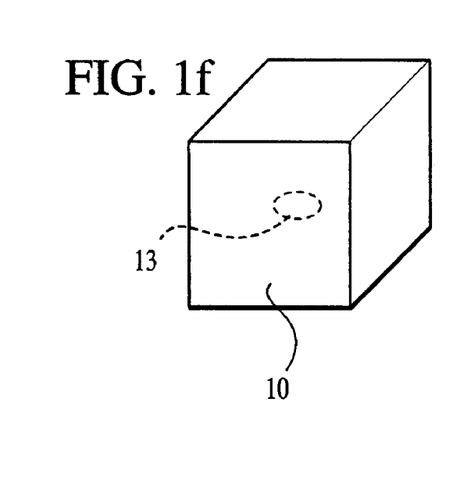
Figure 2A:
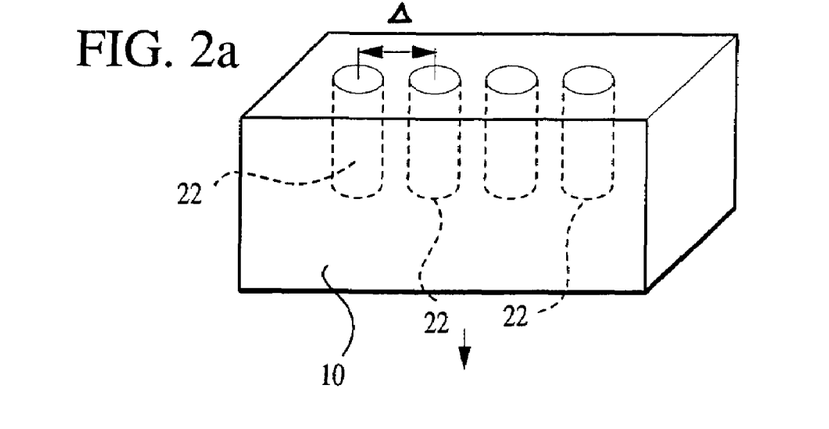
Figure 2B:
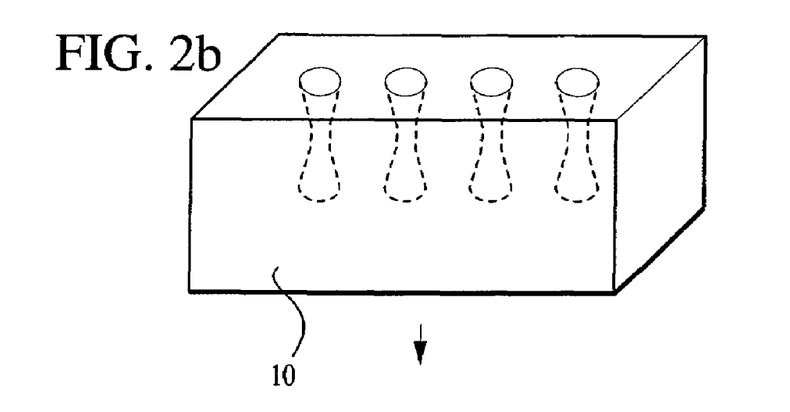
Figure 2C:
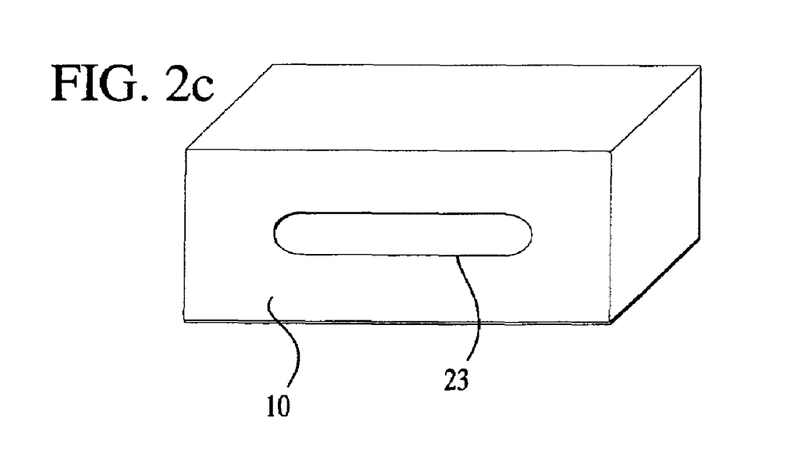
Figure 3A:
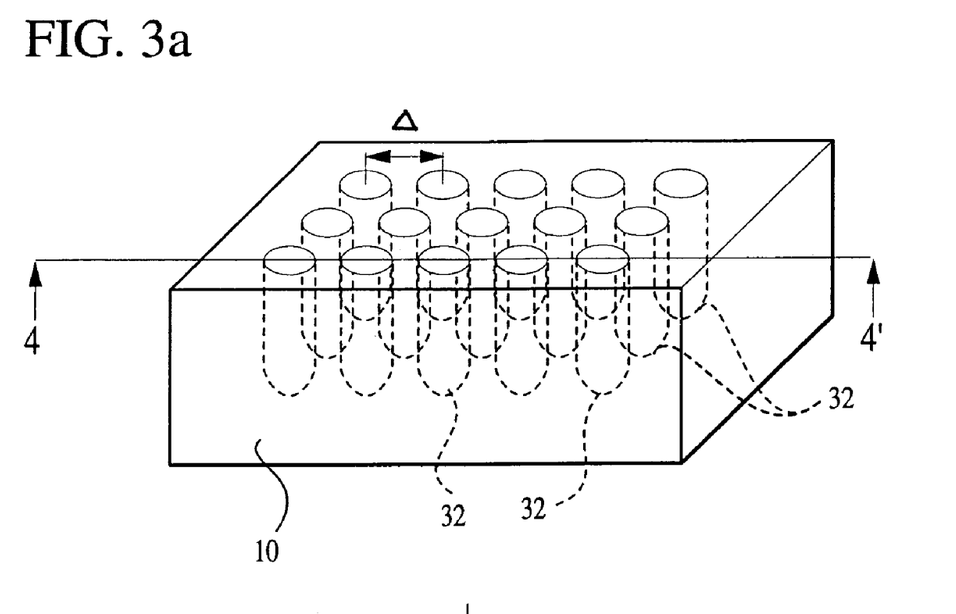
Figure 3B:
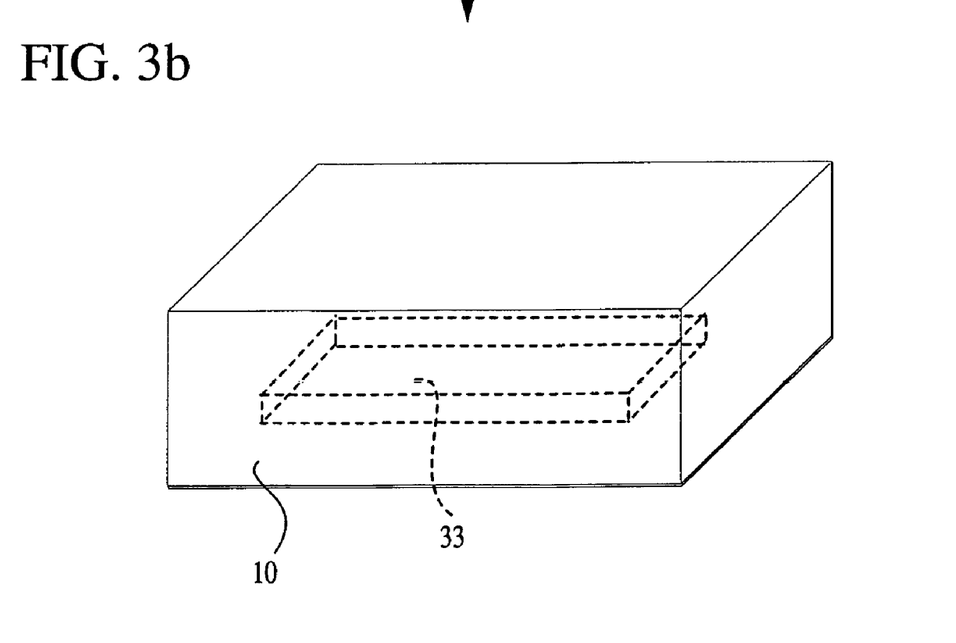

Reference is now made to FIGS. 2(a)-(c), which exemplify the formation of a single pipe-shaped empty space 23 from a linear array of cylindrical holes 22. Similarly, FIGS. 3(a)-(b) illustrate the formation of a single plate-shaped empty space 33 from a two-dimensional array of cylindrical holes 32 formed within a silicon substrate such as the silicon substrate 10. The values of the pipe radius Rp (of the pipe-shaped empty space 23) and that of the plate thickness Tp (of the plate-shaped empty space 33) may be calculated in a manner similar to that described above with reference to the formation of the empty sphere 13 and the calculation of sphere radius Rs in equation (4). The distance A between the centers of any two adjacent cylindrical holes 22, 32, in a linear array, may be calculated from the following formula:

$$2Rc < \Delta < 3.76\, Rc \qquad (6)$$

wherein: Rc=cylinder radius; and

Δ=center-to-center distance between two adjacent cylinder holes in a linear array.

Equation (6) ensures that adjacent cylindrical holes 22, 32 do not touch each other allowing, therefore, the formation of a plurality of adjacent spheres that combine to form the resulting pipe-shaped empty space 23 and plate-shaped empty space 33.

The values of the pipe radius Rp and of the plate thickness Tp are given by the following two expressions:

$$Rp = (8.86\, Rc^3/\Delta)^{1/2} \qquad (7)$$

$$Tp = 27.83\, Rc^3/\Delta^2 \qquad (8)$$

wherein: Rp=pipe radius;

Tp=plate thickness; and

Δ=center-to-center distance between two adjacent cylinder holes in a linear array.

Figure 4:
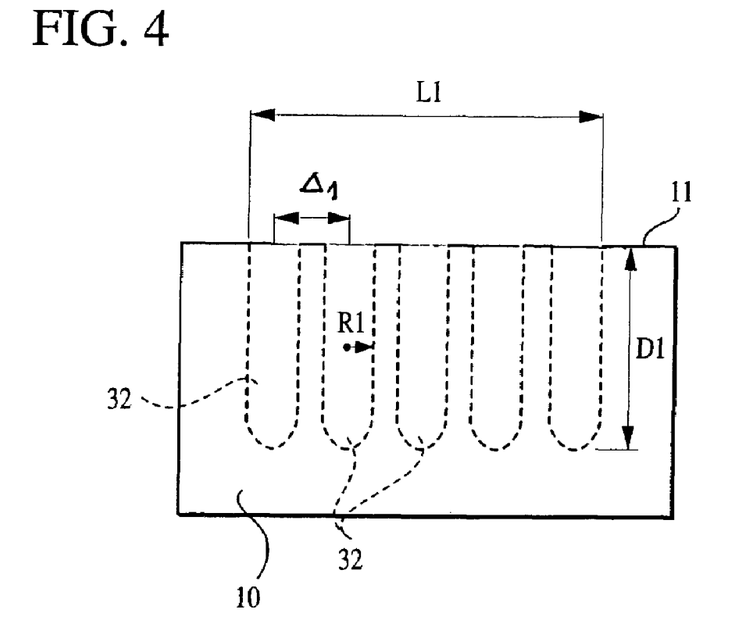
FIG. 4 is a cross-sectional view of the representative silicon structure of FIG. 3(*a*), taken along line 4-4', at an intermediate stage of processing and in accordance with a first embodiment of the present invention.

Reference is now made to FIG. 4 which, for simplicity, illustrates a cross-sectional view of structure of FIG. 3(a) on which a plurality of two-dimensional array of cylindrical holes 32 are drilled into silicon substrate 10 from an upper surface 11 of the substrate 10 to a depth D1.

The silicon substrate 10 is annealed at a temperature of about 1100° C. and under a reducing ambient of about 10 Torr of hydrogen, so that within about 60 seconds the two-dimensional array of cylindrical holes 32 transforms into the first plate-shaped empty space 33 (FIG. 5) by steps similar to those described above with reference to FIGS. 3(a)-(b). For a better understanding of the invention, the structure of FIG. 5 is illustrated in a three-dimensional view.

Radius R1 (FIG. 4) as well as distance Δ1 (FIG. 4) between the center of two adjacent cylindrical holes 32 of the two-dimensional array may be calculated in accordance to equation (6). Further, the length L1 (FIG. 4) of the two-dimensional array of cylindrical holes determines the length L1 (FIG. 5) of the first plate-shaped empty space 33, wherein the depth D1 (FIG. 4) to which the two-dimensional array of cylindrical holes is drilled determines the depth D1 (FIG. 5) at which the first plate-shaped empty space 33 is formed within the silicon substrate 10. In this case, the depth D1 and radius R1 of the cylindrical holes are chosen so that a single plate-shaped empty space, for example the first plate-shaped empty space 33, is formed at depth D1.

The thickness d (FIG. 5) of the first plate-shaped empty space 33 may be calculated in accordance with equation (8), where Tp=d$_1$. As known in the art, this first plate-shaped empty region may be left empty in some areas, so that the region above the plate becomes a silicon-over-nothing area.

Figure 5:
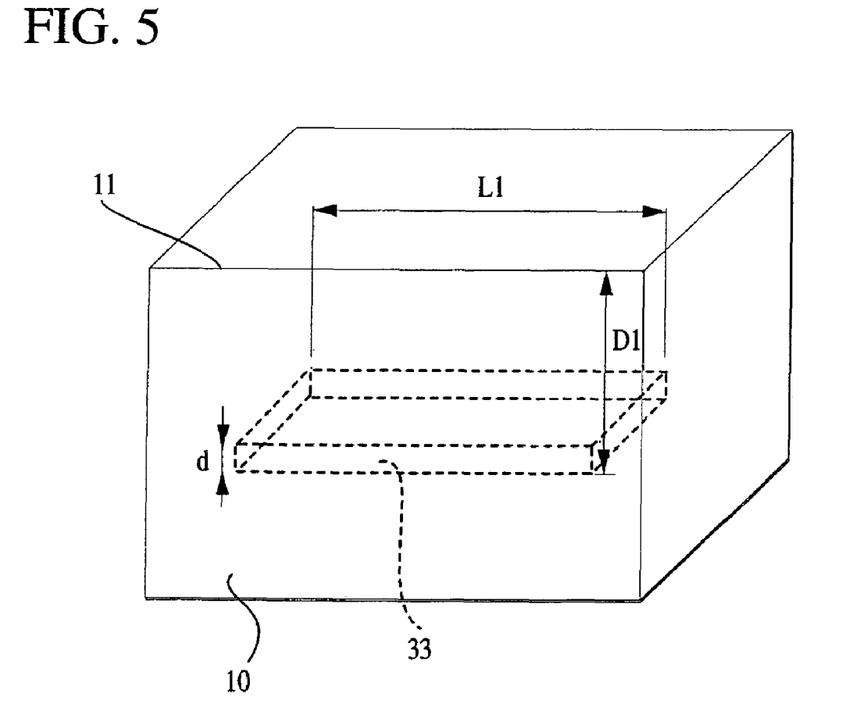
FIG. 5 is a three-dimensional view of the representative silicon structure according to the present invention at a stage of processing subsequent to that shown in FIG. 4.
Figure 6:
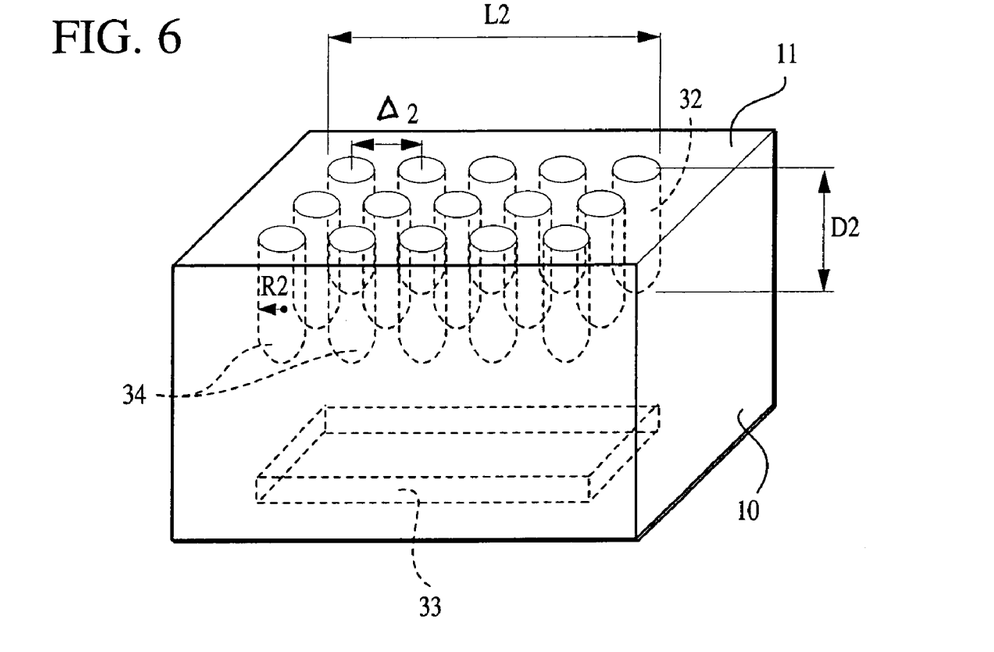
FIG. 6 is a three-dimensional view of the representative silicon structure according to the present invention at a stage of processing subsequent to that shown in FIG. 5.
Figure 7:
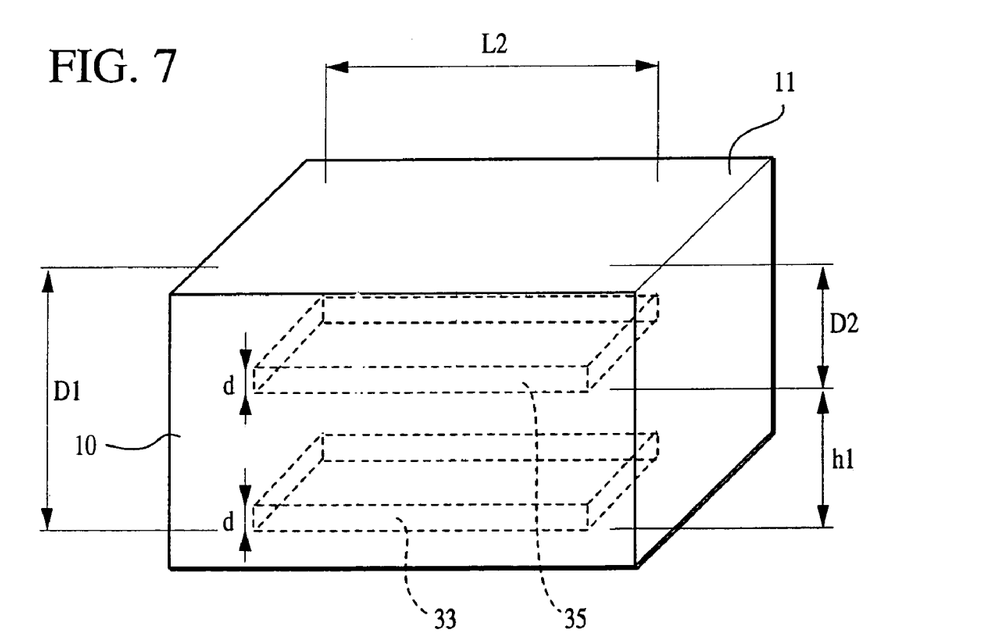
FIG. 7 is a three-dimensional view of the representative silicon structure according to the present invention at a stage of processing subsequent to that shown in FIG. 6.

Subsequent to the formation of the first plate-shaped empty space 33, a second plate-shaped empty space 35 (FIG. 7) may be formed above the first plate-shaped empty space 33 and below the silicon surface 11 by a technique similar to that described for the formation of the first plate-shaped empty space 33 (FIGS. 5-6). As such, a second two-dimensional array of cylindrical holes 34 (FIG. 6) are drilled into the silicon substrate 10 to a depth D2 to define the intended location, length and orientation of a second plate-shaped empty space 33 (FIG. 7). The silicon substrate 10 is then annealed at a temperature of about 1100° C. and under a reducing ambient of about 10 Torr of hydrogen, so that within about 60 seconds the second two-dimensional array of cylindrical holes 34 transforms into the second plate-shaped empty space 35 (FIG. 7) by steps similar to those described above with reference to FIGS. 3(a)-(b).

Radius R2 (FIG. 6) as well as distance Δ2 (FIG. 6) between the center of two adjacent cylindrical holes 34 of the second two-dimensional array may be calculated in accordance to equation (6). Further, the length L2 (FIG. 6) of the second two-dimensional array of cylindrical holes determines the length L2 (FIG. 7) of the second plate-shaped empty space 35, wherein the depth D2 (FIG. 6) to which the second two-dimensional array of cylindrical holes is drilled determines the depth D2 (FIG. 7) at which the second plate-shaped empty space 35 is formed within the silicon substrate 10. The thickness d (FIG. 7) of the second plate-shaped empty space 33 may be calculated in accordance with equation (8), where Tp=d$_2$.

Figure 8:
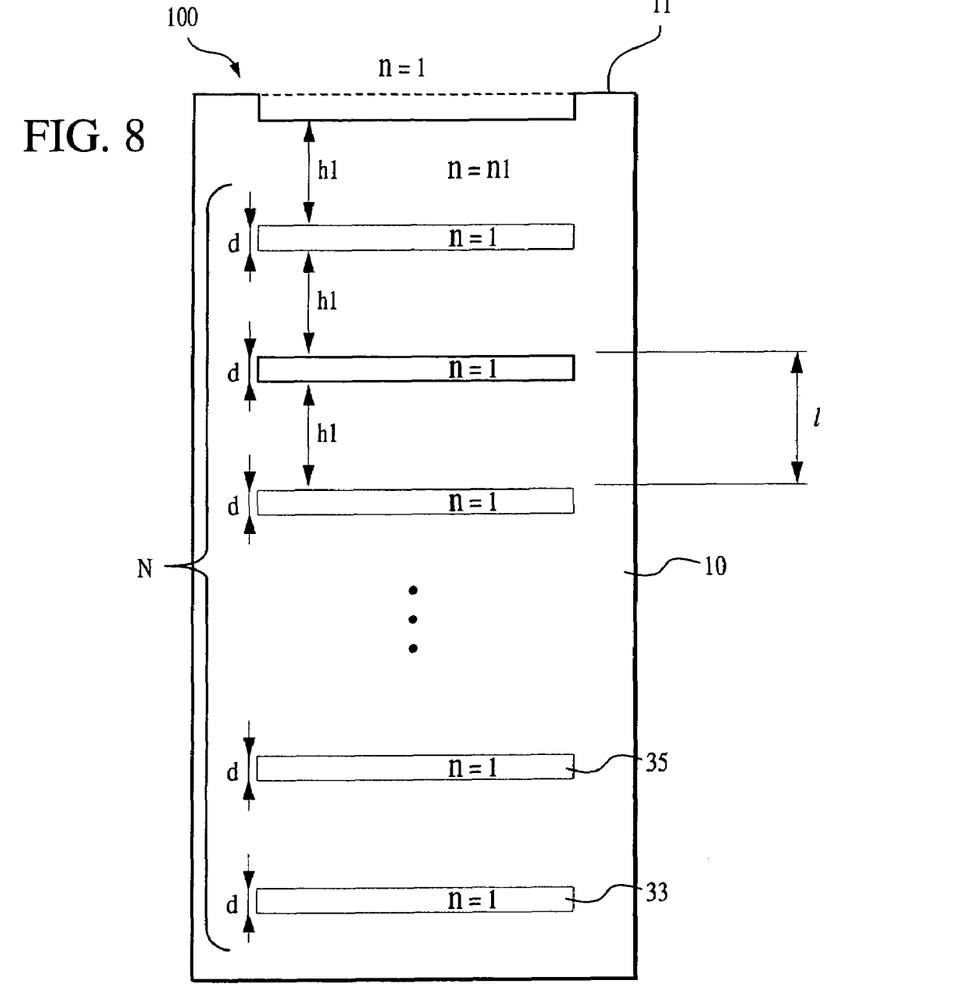
FIG. 8 is a cross-sectional view of the representative multi-layer empty plate according to the present invention.

Although FIG. 7 depicts only two plate-shaped empty spaces 33, 35 formed within the silicon substrate 10, it must be understood that any number "N" of such plate-shaped empty spaces may be formed by repeated application of the process described above and depicted in FIGS. 4-7. Such an "N" step process is required for the formation of a mirror with plate-shaped empty spaces having different thicknesses and/or being spaced non-uniformly. In the case where each plate-shaped empty space has an identical thickness "d" and the thickness of the material layers between any adjacent empty space is h$_1$ and the refractive index of each material layer is n$_1$ as shown in FIG. 8, it is only necessary to drill one, two-dimensional array of cylindrical holes and to undergo one high-temperature anneal step to simultaneously form the N plate-shaped empty spaces depicted in FIG. 8. The formation of a multi-layered dielectric mirror formed in this manner is described in detail below.

As illustrated in FIG. 8, the thickness of each of the N plate-shaped empty spaces is "d," the refraction index of each of the plate-shaped empty spaces is n=1 (for air), the thickness of the material layers between any adjacent plate-shaped empty spaces is h$_1$ and the refraction index of each material layer is n$_1$. Applying these parameters to equation (1), the reflectivity R$_N$ for the multi-layered dielectric mirror 100 is maximum at a free space wavelength λ when both equations (9) and (10) below are true:

$$2dn = 2d = (m + \tfrac{1}{2})\lambda \qquad (9)$$

wherein: d=thickness of each plate-shaped empty space;

n=refraction index of each plate-shaped empty space;

λ=wavelength for which mirror reflectivity is maximum; and m=0, 1, 2, 3, . . .

and $$2h_1 n_1 = (k + \tfrac{1}{2})\lambda \qquad (10)$$

wherein: h1=thickness of material layers between adjacent plate-shaped empty spaces;

n$_1$=refraction index of each material layer;

λ=wavelength for which mirror reflectivity is maximum; and k=0, 1, 2, 3, . . .

The reflectivity R$_N$ for the multi-layered dielectric mirror 100 of FIG. 8 comprising N plate-shaped empty spaces formed as described above is given by the following formula:

$$R_N = (1 - n_1^{2N+1} / 1 + n_1^{2N+1})^2 \qquad (11)$$

wherein: R$_N$=maximum reflectivity of mirror;

n$_1$=refraction index of each material layer; and

N=number of plate-shaped empty spaces.

As such, equation (11) permits the calculation of $R_N$ for various material monocrystalline layers. For example, illustrated below are the values of $R_N$ for N=7 plate-shaped empty spaces formed in a quartz ($SiO_2$) substrate ($SiO_2$ refraction index is $n_1$=1.54) and in a silicon (Si) substrate (Si refraction index is $n_1$=3.44), such as the silicon substrate 10:

|   | $R_N$ for $SiO_2$ | $R_N$ for Si |
|---|---|---|
| N = 0 | 0.045 | 0.302 |
| N = 1 | 0.165 | 0.838 |
| N = 2 | 0.487 | 0.971 |
| N = 3 | 0.741 | 0.9975 |
| N = 4 | 0.881 | 0.9997 |
| N = 5 | 0.942 | ≅1 |
| N = 6 | 0.977 | ≅1 |
| N = 7 | 0.991 | ≅1 |

Further, when the reflectivity $R_N$ for the multi-layered dielectric mirror 100 is maximum at a free space wavelength $\lambda$, the required radius Rc and separation $\Delta_N$ of initial cylinders may be calculated accordingly. Thus, if $1=h_1+d$ (as shown in FIG. 8), and applying equations (5), (9) and (10) it follows that:

$$Rc=1/8.89=(h_1+d)/8.89=\lambda/4[(2k+1)/n1+(2m+1)](1/8.89) \quad (12)$$

Next, when the plate thickness Tp equals d and applying the value of Rc (as calculated in equation 12) to equation (8), the center-to-center distance $\Delta_N$ between two adjacent cylindrical holes in a linear array may be calculated as follows:

$$\Delta_N^2=27.83\ Rc^3/d=27.83\ Rc^3/(2m+1)\lambda/4 \quad (13)$$

wherein: $\Delta_N$=center-to-center distance between two adjacent cylindrical holes;
Rc=cylinder radius;
$\lambda$=wavelength for which mirror reflectivity is maximum; and
m=0, 1, 2, 3, . . .
as long as the values of k and m from the equations (12) and (13) satisfy the equation (14) below:

$$2\ Rc<\Delta_N<3.76\ Rc \quad (14)$$

wherein: Rc=radius of cylindrical hole; and
$\Delta_N$=center-to-center distance between two adjacent cylindrical holes.

Accordingly, applying the value of $\Delta_N$ from equation (13) to equation (14), it follows that:

$$2^2<3.13\{[(1/n1)(2k+1)(2m+1)]+1\}<3.76^2 \quad (15)$$

which must be satisfied by both k and m so that maximum reflectivity can be attained for a mirror fabricated by a method of the present invention.

For illustration, in a case where the material layers are formed of $SiO_2$ (quartz) for which the refraction index is $n_1$=1.54, and where the wavelength $\lambda$=0.2 micron and the number of plate-shaped empty spaces are N=7, then equation (15) is satisfied because real solutions for both k and m exist since:

$$4<3.13[0.649(2k+1)(2m+1)+1]<14.76 \quad (16)$$

Further, when quartz is used as the substrate and assuming that k=m=0; $n_1$=1.54; and the wavelength $\lambda$=0.2 microns, the values of the cylinder radius "Rc," the thickness "d" of the plate-shaped empty space, the thickness "$h_1$" of the quartz layers between adjacent plate-shaped empty spaces, as well as the center-to-center distance $\Delta_N$ between two adjacent cylindrical holes may be calculated according to equations (5), (9), (10) and (13), respectively, to obtain the following values:

Rc=0.00928 microns;
$h_1$=0.03256 microns;
d=0.05 microns; and
$\Delta_N$=0.021 microns.

Also, the length L of a cylindrical hole could be also calculated from the above parameters as applied to equation (3) as follows:

$$0.5775\ \text{microns} \leq L<0.6560\ \text{microns} \quad (17)$$

By using larger integer values for k and/or m, the values of "Rc," "d," "$h_1$" and "$\Delta_N$," may be increased accordingly. If the value of L is chosen as the lower limit (for example, as the lower limit 0.5775 from equation (17) corresponding to N=7 for multi-layered quartz), the top surface above the plate-shaped empty spaces will be at the same level as the top surface 11 of the substrate 10. If, however, the value of L is chosen as the upper limit (for example, as the upper limit 0.6560 from equation (17) corresponding to N=7 and quartz layers) or at least greater than the lower limit, then the top surface above the plate-shaped empty spaces will be lower than the to surface 11 of substrate 10, as illustrated in FIG. 8.

When quartz is used as the monocrystalline substrate material, the annealing temperature for the formation of the plate-shaped empty spaces 33, 35, for example, could be higher than the annealing temperature of about 1100° C. used for a silicon substrate. Since the melting temperature of quartz is of about 1610° C. and, thus, higher than the melting temperature of silicon which is of about 1400° C., an annealing temperature of about 1100° C. and even higher could be used for the formation of a quartz mirror by the methods described above. Further, to avoid the loss of oxygen from the quartz material, an oxidizing rather than reducing ambient atmosphere could be used for the formation of the plate-shaped empty spaces. In any event, since the multi-layered dielectric mirror 100 utilizes only one material, such as silicon or quartz, among others, low internal loss is easily achieved.

Although the present invention has been described above with reference to the formation of reflective mirrors in silicon and quartz substrates, it must be understood that any substrate material having a uniform composition in the area of interest and a reasonably defined melting point may be used also. The annealing temperature for the formation of the plate-shaped empty spaces in such substrate material must be calculated and experimentally determined on a case-by-case analysis, as the annealing temperatures for forming empty spaces by surface transformation in substrates other than silicon and quartz have not been calculated yet by those skilled in the art. In any event, the annealing temperature must be lower than the melting point of such substrate material. The annealing temperature also depends greatly upon the self-organizing migrating properties of the substrate material to achieve minimal surface energy, as well as upon the reaction time and the extend of damage inflicted to the surfaces where cylindrical holes are drilled.

Although the present invention has been specifically described above with reference to the multi-layered dielectric mirror 100 formed of N=7 plate-shaped empty spaces, it must be understood that the present invention contemplates the formation of a reflective mirror with any number "N" of such plate-shaped empty spaces. As such, the invention contemplates, for example, the formation of a reflective mirror with only one plate-shaped empty space. In that case, however, the mirror reflectivity $R_N$ is much lower than that for a mirror having multiple plate-shaped empty spaces. For example, as calculated above with reference to equation (11), the maximum reflectivity of a mirror for silicon is of about 0.838, meaning that the single plate-shaped empty space mirror has a reflectivity of about 83% only. As known in the art, such a mirror could be useful as an output mirror of a laser which requires only about 80% reflectivity.

The formation of the multi-layered dielectric mirror 100 was described above with reference to N=7 plate-shaped empty spaces having same thicknesses and been spaced apart uniformly. It must be understood, however, that the present invention contemplates the formation of a reflective mirror with plate-shaped empty spaces having different thicknesses and/or being spaced apart non-uniformly. In such cases, the plate-shaped empty spaces will have different reflectivities and different phase-shifts, depending on the respective thickness and refractive index corresponding to each plate-shaped empty space. The general formula for calculating the reflectivity from periodically stratified media where there is no requirement on thicknesses and/or indices is very complex but may be found in Section 1.6.5 entitled "Periodically Stratified Media" in M. Born and E. Wolf, *Principles of Optics* at pp. 65-69, (Pergamon Press 1959), the disclosure of which is incorporated by reference herein.

Figure 9:
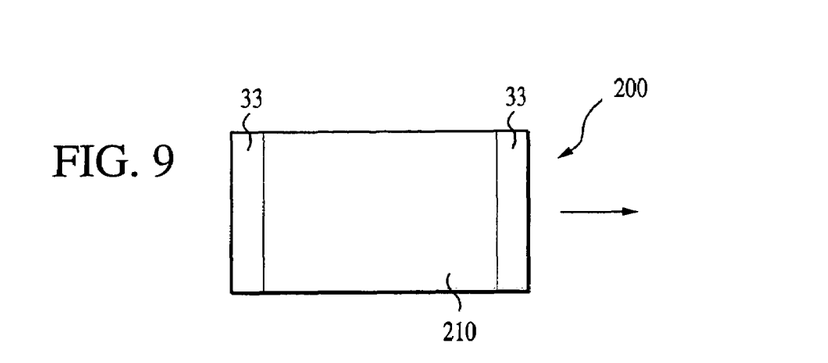
FIG. 9 is a schematic cross-sectional view of a laser assembly fabricated in accordance with the present invention.

The multi-layered dielectric mirror 100 formed by the method of the present invention described above could be used, for example, as a patterned reflective mask which can withstand high incident power levels, or as a high-reflectivity mirror below the junction of a vertical cavity laser. The multi-layered dielectric mirror 100 of the present invention may be also used as one or more embedded mirrors 33 in the end faces of an optically pumped solid state ion laser assembly 200, comprising a body 210 for producing laser light, which is illustrated in FIG. 9.

The above description and drawings are only to be considered illustrative of exemplary embodiments which achieve the features and advantages of the present invention. Modification and substitutions to specific process conditions and structures can be made without departing from the spirit and scope of the present invention. Accordingly, the invention is not to be considered as being limited by the foregoing description and drawings, but is only limited by the scope of the appended claims.

What is claimed as new and desired to be protected by Letters Patent of the United States is:

1. A method of forming a reflective mirror within a substrate, said method comprising the acts of:
   providing a substrate having a melting temperature;
   forming a plurality of cylindrical holes within said substrate, each of said plurality of cylindrical holes being defined by a radius $R=\lambda/4 \ [(2k+1)/n+(2m+1)] \ (1/8.89)$, wherein $\lambda$ is a wavelength for which the reflectivity of said reflective mirror is maximum, n is the refraction index of said substrate, and k and m are real integers, and wherein any two adjacent cylindrical holes are spaced apart by a distance $\Delta N2=27.83 \ R3/(2m+1)\lambda/4$; and
   subjecting said substrate to a temperature lower than the melting temperature of said substrate to form a plurality of empty-spaced patterns beneath a surface of and within said substrate, said empty-spaced patterns being sequentially positioned along an optical path of said substrate.

2. The method of claim 1, wherein at least one of said empty-spaced patterns is a plate-shaped empty-spaced pattern.

3. The method of claim 2, wherein at least two of said plate-shaped empty-spaced patterns have same thicknesses.

4. The method of claim 2, wherein at least two of said plate-shaped empty-spaced patterns have different thicknesses.

5. The method of claim 1, wherein said empty-spaced patterns are plate-shaped empty-spaced patterns that are formed simultaneously.

6. The method of claim 5, wherein said plate-shaped empty-spaced patterns are spaced apart uniformly.

7. The method of claim 5, wherein said plate-shaped empty-spaced patterns are spaced apart non-uniformly.

8. The method of claim 1, wherein said substrate comprises a material selected from the group consisting of silicon, quartz, germanium gallium arsenide, and indium gallium arsenide.

9. A method of forming a patterned reflective mask within a substrate, said method comprising the acts of:
   providing a quartz substrate;
   forming a plurality of cylindrical holes within said quartz substrate, each of said plurality of cylindrical holes being defined by a radius $R=\lambda/4 \ [(2k+1)/n+(2m+1)] \ (1/8.89)$, wherein $\lambda$ is a wavelength for which the reflectivity of said reflective mirror is maximum, n is the refraction index of said substrate, and k and m are real integers, and wherein any two adjacent cylindrical holes are spaced apart by a distance $\Delta N2=27.83 \ R3/(2m+1)\lambda/4$; and
   annealing said quartz substrate at a temperature of at least about 1100° C. and under an oxidizing ambient, to form a plurality of empty-spaced patterns beneath a surface of and within said quartz substrate, said empty-spaced patterns being sequentially positioned along an optical path of said quartz substrate.

10. The method of claim 9, wherein at least one of said empty-spaced patterns is a plate-shaped empty-spaced pattern.

11. The method of claim 9, wherein at least two of said plate-shaped empty-spaced patterns have same thicknesses.

12. The method of claim 9, wherein at least two of said plate-shaped empty-spaced patterns have different thicknesses.

13. The method of claim 9, wherein said empty-spaced patterns are plate-shaped empty-spaced patterns that are formed simultaneously.

14. The method of claim 13, wherein said plate-shaped empty-spaced patterns are spaced apart non-uniformly.

15. An integrated circuit substrate comprising:
   at least one reflective mirror provided beneath a surface of, and within, a semiconductor substrate, said reflective mirror comprising a plurality N of empty-spaced patterns located beneath said surface of and within said substrate, said empty-spaced patterns being positioned along an optical path of said substrate and being surrounded by substrate material, wherein said at least one reflective mirror is characterized by a maximum reflectivity value $R_N=(1-n_1^{2N+1}/1+n_1^{2N+1})^2$, wherein $n_1$ is the refraction index of the semiconductor substrate and wherein N is the number of empty-spaced patterns.

16. The integrated circuit of claim 15, wherein said empty-spaced patterns include at least one plate-shaped empty-spaced pattern.

17. The integrated circuit of claim 15, wherein each of said empty-spaced patterns has a respective refraction index.

18. The integrated circuit of claim 15, wherein said maximum reflectivity value corresponds to maximum electromagnetic wave reflection for said reflective mirror.

19. The integrated circuit of claim 15, wherein said semiconductor substrate comprises a material selected from the group consisting of silicon, quartz, germanium gallium arsenide, and indium gallium arsenide.

20. The integrated circuit of claim 15, wherein said semiconductor substrate is a silicon-on-insulator substrate or a silicon-on-nothing substrate.

21. The integrated circuit of claim 15, wherein said semiconductor substrate includes a laser.

22. The integrated circuit of claim 21, wherein said laser is a vertical cavity laser and said reflective mirror is located below a junction of said vertical cavity laser.

23. The integrated circuit of claim 21, wherein said laser is a solid state ion laser and said reflective mirror is embedded within at least one end face of said solid state ion laser.

* * * * *